United States Patent
Desai

(10) Patent No.: US 10,942,642 B2
(45) Date of Patent: Mar. 9, 2021

(54) SYSTEMS AND METHODS FOR PERFORMING ERASURES WITHIN A GRAPHICAL USER INTERFACE

(71) Applicant: AirWatch, LLC, Atlanta, GA (US)

(72) Inventor: Alok Piyush Desai, Atlanta, GA (US)

(73) Assignee: AirWatch LLC, Seattle, WA (US)

( * ) Notice: Subject to any disclaimer, the term of this patent is extended or adjusted under 35 U.S.C. 154(b) by 887 days.

(21) Appl. No.: 15/058,235

(22) Filed: Mar. 2, 2016

(65) Prior Publication Data

US 2017/0255378 A1  Sep. 7, 2017

(51) Int. Cl.
*G06F 3/0488* (2013.01)
*G06F 3/0484* (2013.01)

(52) U.S. Cl.
CPC ...... *G06F 3/04883* (2013.01); *G06F 3/04845* (2013.01)

(58) Field of Classification Search
CPC .... G06F 3/0488; G06F 3/0484; G06F 3/0354; G06F 16/20; G06F 16/30; G06F 17/20; G06F 17/30; G06F 3/00; G06F 3/04883; G06F 40/00; G06F 3/048; G06F 2203/048

See application file for complete search history.

(56) References Cited

U.S. PATENT DOCUMENTS

| | | | | |
|---|---|---|---|---|
| 2006/0001656 A1* | 1/2006 | LaViola, Jr. | ........ | G06F 3/04883 345/179 |
| 2007/0177804 A1* | 8/2007 | Elias | ................... | G06F 3/04883 382/188 |
| 2007/0285399 A1* | 12/2007 | Lund | ................... | G06F 3/04883 345/173 |
| 2009/0077464 A1* | 3/2009 | Goldsmith | ............ | G06F 3/0237 715/257 |
| 2010/0306649 A1* | 12/2010 | Russ | ................... | G06F 3/04883 715/702 |
| 2011/0098056 A1* | 4/2011 | Rhoads | ................... | G01C 21/20 455/456.1 |
| 2011/0258537 A1* | 10/2011 | Rives | ................... | G06F 3/04883 715/255 |
| 2011/0310005 A1* | 12/2011 | Chen | ................... | G06F 1/3203 345/156 |
| 2012/0013556 A1* | 1/2012 | Chen | ................... | G06F 3/017 345/173 |
| 2013/0055160 A1* | 2/2013 | Yamada | ................... | G06F 3/017 715/810 |
| 2013/0239062 A1* | 9/2013 | Ubillos | ................... | H04L 51/24 715/838 |
| 2014/0006983 A1* | 1/2014 | Goodman | ............ | G06F 3/0483 715/764 |
| 2014/0223382 A1* | 8/2014 | Hicks | ................... | G06F 3/04883 715/863 |

(Continued)

*Primary Examiner* — Sanchita Roy

(74) *Attorney, Agent, or Firm* — Thomas | Horstemeyer LLP

(57) ABSTRACT

Examples described herein include improved systems and methods for performing erasures and edits within a graphical user interface. A computing device can include a processor that detects skin contact with a touch-screen display of the computing device. The processor can also detect, based on the skin contact, a gesture that indicates an erasure function. Based on that determination, the processor executes the erasure function.

20 Claims, 5 Drawing Sheets

(56) References Cited

U.S. PATENT DOCUMENTS

| | | | |
|---|---|---|---|
| 2014/0351725 A1* | 11/2014 | Kim | G06F 3/04883 715/765 |
| 2015/0058753 A1* | 2/2015 | Anderson | G06F 3/04812 715/753 |
| 2015/0153925 A1* | 6/2015 | Li | G06F 3/04883 715/768 |
| 2016/0004380 A1* | 1/2016 | Kim | G06F 3/0416 345/174 |
| 2016/0077620 A1* | 3/2016 | Choi | G06F 3/0488 345/173 |
| 2017/0024104 A1* | 1/2017 | Angermayer | G06F 3/04883 |

\* cited by examiner

SYSTEMS AND METHODS FOR PERFORMING ERASURES WITHIN A GRAPHICAL USER INTERFACE

BACKGROUND

Touch-screen computing devices continue to grow in popularity. These devices can include cell phones, laptops, tablets, personal computers, and workstations. Many touch-screen computing devices are compatible with a "stylus"—an input tool used to accurately provide inputs to the device. A stylus can be used to navigate interface elements, write, type, and draw. Some styluses and touch-screen devices include force detection, allowing a user to change the nature of the input based on the application of varying amounts of force through the stylus. The flexibility and accuracy of a stylus lends itself to drawing in particular.

While styluses can be great tools for providing inputs to touch-screen devices, they fall short in the area of erasing and editing. Typically, a user is limited to the traditional erasing and editing tools built into the software application being used. For example, when using a drawing application, the user can select the erase function using one or more clicks, optionally select the size of the eraser, and then apply the eraser. After completing the erasure, the user must then deselect the eraser to continue drawing or writing with the stylus. Alternatively, the user can select the native "undo" function if the application supports it. But the native undo function is not a precise tool, and can revert more or less content than desired.

Some styluses include a button or sensor tied to an erasing function. For example, a user can touch the screen of a computing device with the non-writing end of a stylus to perform an erasure. This method of erasing has several drawbacks as well. For example, the user is still required to use the stylus to erase, is limited to a particular eraser size, and is prevented from making edits beyond erasing.

For at least these reasons, a need exists for improved systems and methods for performing erasures and edits within a graphical user interface, regardless of whether a stylus is used.

SUMMARY

Both the foregoing general description and the following detailed description are exemplary and explanatory only. The claims are not intended to be limited to the descriptions and examples herein.

In one example, a computing device with a touch-screen display is provided. A computing device can include cell phones, smartphones, laptops, tablets, personal computers, workstations, or any other types of computing devices. The computing device can include a non-transitory, computer-readable medium that contains instructions, and a processor that executes the instructions to perform various stages. The processor can perform a stage of detecting skin contact with the touch-screen display. Skin contact typically includes any portion of a user's hand, but can include other body parts such as a forearm. The processor can also perform a stage of detecting, based on the skin contact, a gesture. A gesture can include any predefined physical interaction between a user's body and the touch-screen display. For example, one common type of gesture is dragging two fingers vertically up or down along a touch-screen display or touchpad. Typically, a computing device will recognize this gesture as a request to perform a scrolling function.

Continuing the example, the processor can perform a stage of determining that the gesture indicates an erasure function. Based on that determination, the processor can execute the erasure function. In one example, determining that the gesture indicates the erasure function includes comparing the gesture to at least one predetermined erasure-initiation gesture. The at least one predetermined erasure-initiation gesture can include at least one of: a back-and-forth swipe, a wiping motion using a palm of a hand, a wiping motion using a side of a hand, an extended finger press, a force finger press, or a looping motion using a finger, although other gestures are possible.

In one example, determining that the gesture indicates the erasure function includes analyzing at least one gesture factor. A gesture factor can include at least one of: a location of the gesture on the display, a proximity of the gesture to an erasable item, a force of the finger contact, a number of fingers associated with the gesture, an application associated with the gesture, and a fingerprint identification of a finger used for the gesture, among other things.

A gesture factor can also involve a stylus. For example, the gesture factor can include a time period between when the stylus was last detected relative to the touch-screen display and when the gesture is detected. A gesture factor can also be based on proximity or orientation, such as a proximity of the stylus to the touch-screen display, a proximity of the stylus to the skin contact, and an orientation of the stylus relative to the touch-screen display, among other things.

In one example, the computing device can distinguish different levels of force applied through the user's contact with the touch-screen display. The force component of the user's touch can be part of a gesture factor. The force component can be utilized in a variety of ways, including selecting between multiple layers of an image or application. For example, the processor can perform additional stages of determining a force component to the skin contact, and determining a layer within a plurality of layers in which to perform the erasure function based on the force component. The force component can be used in other ways as well, including selecting between windows, selecting depth in three-dimensional environments, and others.

In some examples, the computing device executes a process for ending the erasure function. For example, after initiating the erasure function the user might change their mind and decide to wait for the erasure function to end. Alternatively, the user can make erasures using the erasure function and then wait for the erasure function to end. The computing device can consider the amount of time elapsed and determine when to end the erasure function. For example, a first time period can be measured from the time of the gesture associated with the erasure function. A second time period can be measured from the time of a last skin contact associated with executing the erasure function to perform an erasure. If either time period elapses without additional skin contact, the processor can end the erasure function.

After making an erasure, a user might wish to undo some or all of the erasure and recapture the erased content. Accordingly, in some examples the processor of the computing device can detect a rewind gesture. The rewind gesture causes the processor to restore at least a portion of the erased content. For example, the rewind gesture can restore a portion of the erased content in a manner proportional to the amount of "rewinding" involved in the rewind gesture.

In another example, a non-transitory, computer-readable medium is provided. The computer-readable medium contains instructions that, when executed by a process, perform stages for executing an erasure function on a touch-screen display. This can include detecting skin contact with the touch-screen display. Based on the skin contact, the processor can detect a gesture and determine that the gesture indicates an erasure function. The processor can then execute the erasure function. The non-transitory, computer-readable medium can be installed on any type of computing device with a touch-screen display.

In yet another example, a method is provided for executing an erasure function on a touch-screen display. The method can include, for example, detecting skin contact with the touch-screen display; detecting, based on the skin contact, a gesture; determining that the gesture indicates an erasure function; and based on the determination, executing the erasure function. The method can be carried out on any type of computing device with a touch-screen display.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems for performing erasures and other functions within a graphical user interface ("GUI") of a touch-screen device. A touch-screen device can be any computing device—such a smartphone, laptop, tablet, personal computer, or workstation—responsive to tactile user input on or near the display of the device. The tactile user input can include fingertip contact, skin contact by any part of a user's body, and contact from an input device such as a stylus. A "stylus" can include any device used to input commands to a touch-screen device, including a stylus pen, digital pen, active pen, light pen, digital pencil, and so on.

The description below encompasses several major functions that a user can perform by interacting with the GUI of a touch-screen device. First, a user can perform an erasure-initiation function in order to cause the touch-screen device to initiate the erasure function. Various mechanisms and methods for initiating an erasure function are described in conjunction with the description of FIG. 1. Once the erasure function is initiated, a user can perform erasures in multiple ways. Erasing is described in more detail with respect to FIG. 2. At some point after initiation of the erasure function, the device can choose to end the erasure function using decision-making criteria. After ending the erasure function, the device can perform a rewind function to undo some or all of the erasures or other edits made by a user. The rewind function is discussed in more detail with respect to FIG. 3.

Furthermore, a user can take advantage of a device's force-touch detection to perform various functions. Some of these functions are discussed in connection with FIG. 4. A discussion of the overall method is provided in conjunction with FIG. 5. Finally, additionally gesture-based functions, such as text editing, are described as well.

Figure 1:
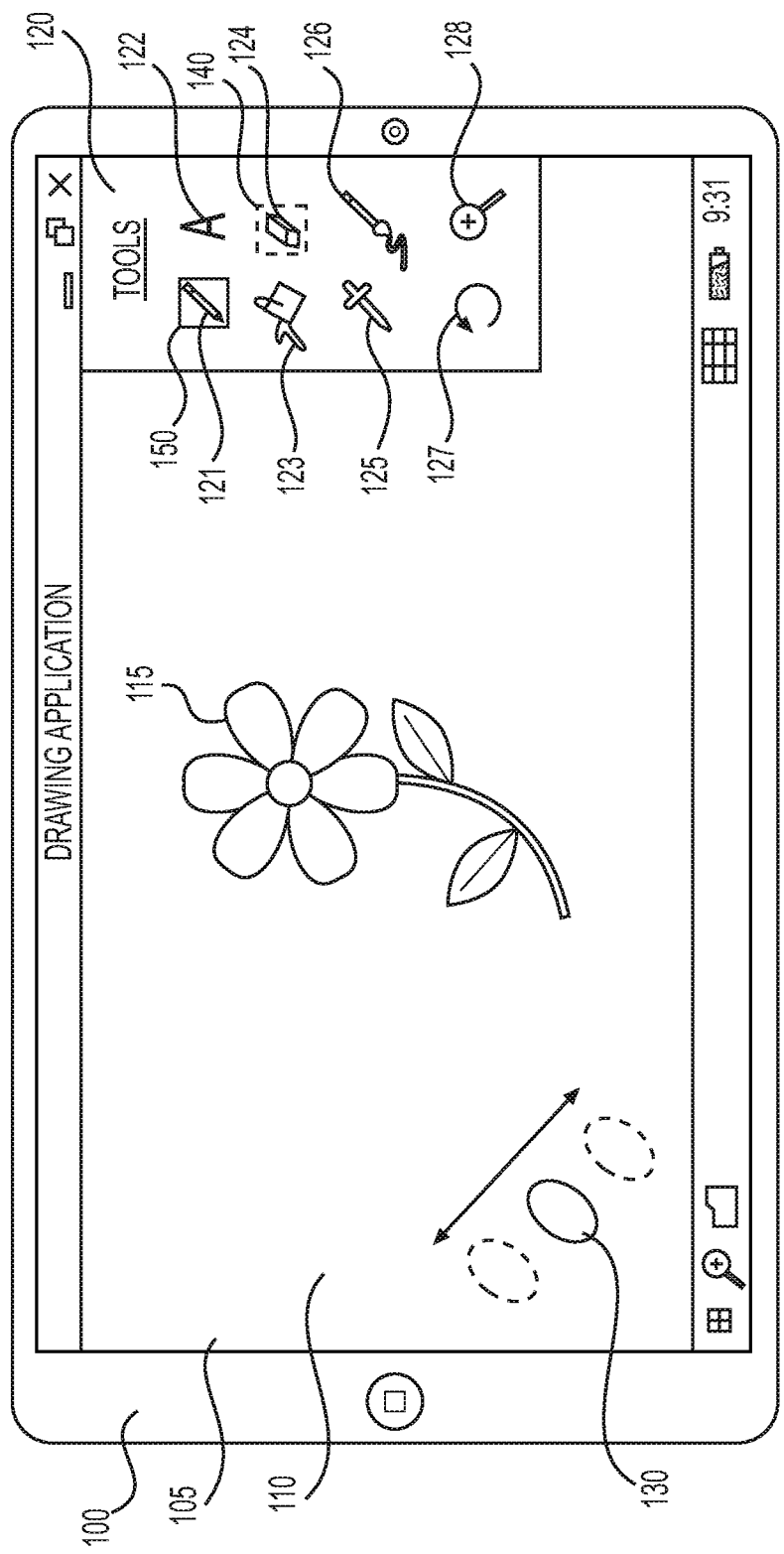
FIG. 1 is an exemplary illustration of a device with a touch-screen display implementing an erasure function.

FIG. 1 provides an exemplary touch-screen device 100 including a touch-screen display 105 displaying a GUI 110. The touch-screen device 100 can be any computing device—such as a smartphone, laptop, tablet, personal computer, or workstation—responsive to tactile user input on or near the display of the device. The touch-screen device 100 can include non-transitory computer-readable medium containing instructions that are executed by a processor. Example non-transitory, computer-readable mediums include RAM and ROM, disks, and other memory and storage that is accessible by a USB port, a floppy drive, CD-ROM, or DVD-ROM drive, and a flash drive, among others.

The touch-screen device 100 of FIG. 1 is shown executing an application on the GUI 110. Although many of the touch- or gesture-based functions discussed herein are described with respect to a Drawing Application, these functions can be used with any other type of application. For example, some or all of the functions described herein can be used with notetaking applications, email applications, photo-editing applications, video-editing applications, Internet browsers, text-based applications, spreadsheet applications, and so on. Some applications can benefit from touch- or gesture-based functions specific to that application, while other touch- or gesture-based functions can be similar across multiple different applications.

In the Drawing Application shown on the GUI 110 of the device 100 in FIG. 1, a drawing 115 is shown next to a toolbar 120. The drawing 115 is intended to represent an item created by the user using the Drawing Application, but could also be a photograph, screenshot, clipart, or other image created elsewhere. The drawing 115 can include a single layer or include multiple layers with each layer containing a different portion of the drawing 115.

The toolbar 120 can include at least some of the tools included in the Drawing Application or built in to the operating system of the touch-screen device 100. The toolbar 120 shown in FIG. 1 includes typical tools that can be found in a photo-, drawing-, or video-editing application. For example, the toolbar 120 includes a pencil tool 121, text tool 122, paint-bucket tool 123, eraser tool 124, color-picker tool 125, paintbrush tool 126, undo button 127, and zoom tool 128.

The pencil tool 121 can be used to apply color in an accurate manner, such as pixel-by-pixel. The text tool 122 can be used to insert a text object in the workspace of the Drawing Application. The paint-bucket tool 123 can be used to fill an area of the workspace with a particular color. The eraser tool 124 can be used to erase portions of the workspace, and can include settings for selecting different sizes of erasers. The color-picker tool 125 can be used to select a color that matches a color of an object in the workspace. The paintbrush tool 126 can be used to apply color to the workspace in varying manners, depending on the selected size of the paintbrush. The undo button 127 can be used to reverse the last action taken by a user—for example, a deletion, erasure, paint fill, or other drawing edit. Finally, the zoom tool 128 can be used to adjust the zoom level of the workspace of the Drawing Application. Some or all of these tools can be built into the operating system of the device 100 rather than provided as a toolbar 120 within the Drawing Application. The particular tools depicted in the toolbar 120 are exemplary only. In practice, a variety of tools can be made available to the user regardless of whether they are shown in this toolbar 120, and the availability of tools can change based on the type of application running on the user's device 100.

In FIG. 1, the pencil tool 121 is depicted as being active, having a selection indicator 150 surrounding the pencil tool 121. However, as a result of an erasure-initiation gesture by touch point 130, the eraser tool 124 is shown as being temporarily active. The temporary active status of the eraser tool 124 is indicated by a temporary selection indicator 140. In one example, the GUI 110 need not display a temporary selection indicator 140. For example, if user applies a touch point 130 to an application that does not include an icon associated with an erasure function, then the application can initiate the erasure without providing a temporary selection indicator 140. In some examples, the GUI 110 can display an icon indicating to the user that an erasure-initiation gesture has been detected. The pencil tool 121 can retain the selection indicator 150 throughout the erasure function, such that the pencil tool 121 remains activated when the erasure function is terminated. This can improve productivity and ease of use for the user without compromising functionality.

In this example, the erasure-initiation procedure can be performed by a touch point 130 applied to the GUI 110 by the user. The touch point 130 and its associated movement is illustrated in FIG. 1, though in practice the GUI 110 need not display touch point 130. While the user can create touch point 130 by any type of skin contact with the touch-screen display 105 of the device 100, in this example touch point 130 represents a fingertip of the user.

As shown in FIG. 1, the user can move his or her fingertip back and forth, approximately in the areas designated by the dashed lines on either side of the touch point 130. The arrow above the touch point 130 indicates that the user can drag his or her finger from side to side. The touch-screen display 105 of the device 100 can include at least one sensing mechanism for sensing the presence, location, pressure, and movement of touch point(s) 130. For example, the touch-screen display 105 can utilize capacitive sensing, resistive sensing, force sensing, magnetic sensing, or any other type of sensing technology to determine a touch point 130.

The device 100 captures information regarding a user's interaction with the touch-screen display 105 and analyzes that information to determine whether the interaction includes a touch point 130 that can indicate an erasure-initiation procedure. The device 100 can include a processor that receives information regarding user interaction with the touch-screen display 105 and makes one or more determinations regarding that interaction. For example, the processor can execute a detection process for interactions with the screen. The detection process can be an operating-system process or sub-process that quantizes the user's interaction and performs further analysis on the quantized values. The quantized values can be generated by the operating system or a display driver associated with the touch-screen display 105. To describe the touch point 130, the quantized values can include coordinate information defining a location, shape, or area of skin contact. The quantized values can also include force information representing levels of force of the skin contact. The quantized values can also include vector information indicating a direction or speed of movement relative to the touch-screen display 105 based on a set of samples.

In one example, the Drawing Application can implement a listener process to receive quantized values from the operating system or display driver. The processor can compare the quantized values to a library of recognized gestures stored in the memory of the device 100. If the quantized values fall within the recognized bounds of a particular gesture, the processor can determine that the user intended that particular gesture and, as a result, perform further processing in line with that gesture. This can allow the Drawing Application or other application to implement a library of application-specific gestures in one example.

Continuing the discussion of FIG. 1, one of the recognized gestures in the library stored in the memory of the device 100 can be an erasure-initiation gesture. Of course, there can be many erasure-initiation gestures, and the different gestures can cause the processor to perform different tasks upon recognition. For example, an erasure-initiation gesture involving two touch points 130 can cause the processor to not only initiate the erase function, but also adjust the zoom within the application to assist the user in performing erasures.

In some examples, multiple gesture libraries can be stored on the device 100 for access and comparison to the user's input. In addition to the standard gesture library included on a device 100, the device 100 can also have gesture libraries that are specific to individual applications. For example, a Drawing Application can store a drawing gesture library in the memory of the device 100. The drawing gesture library can be accessed in particular circumstances, such as when the Drawing Application is active or when the user provides tactile input in an area of the touch-screen display 105 corresponding to the Drawing Application. In other circumstances, the device 100 can limit searching the drawing gesture library to conserve energy and processing power.

When making a gesture determination, the device 100 can take into account various factors. One factor, mentioned above, is whether a particular application is running or active on the GUI 110. However, other factors can be accounted for as well. For example, the device 100 can consider factors related to the use of a stylus.

In one example, the device 100 can discount or ignore skin contact from the user that is associated with using the stylus. For example, the device 100 can detect when a stylus is contacting or near the touch-screen display 105. When the stylus is contacting the touch-screen display 105, a portion of the user's hand is likely to be contacting the touch-screen display 105 as well. In this scenario, the device 100 can discount the portion of the user's hand associated with using the stylus, such that the device 100 does not consider movement of that portion of the user's hand. The device 100 can accomplish this task by, for example, not executing a gesture recognition process for skin contact in a shape, size, and location indicative of incidental hand contact from the use of the stylus. Alternatively, the device 100 can execute the gesture recognition process but determine, as a result of that process, that the skin contact is indicative of incidental hand contact. In either case, the device 100 does not select the eraser tool 124 as a result of incidental hand contact based on using a stylus.

When analyzing skin contact with the touch-screen display 105 to determine whether a gesture is intended, the device 100 can consider whether the stylus is currently being used. Furthermore, the device 100 can consider the amount of time that has elapsed since the stylus has stopped being used. For example, when a user is actively drawing with the stylus, the device 100 can block the Drawing Application from selecting the eraser tool 124 as a result of user contact with the touch-screen display 105. The device 100 can perform this function as part of its gesture analysis—that is, the device 100 determines that the user contact is not intended to be an erasure-initiation gesture.

Alternatively, in the time immediately after the user ceases use of the stylus, the device 100 can provide a heightened sensitivity to an erasure-initiation gesture. For example, the device 100 can utilize a lower threshold for determining that user input matches an erasure-initiation gesture. The device 100 can make this modification based on a determination that the user is more likely than normal to utilize the eraser tool 124. For example, a user can be more likely to erase an item within a particular time period after performing a drawing-related process. This heightened sensitivity to an erasure-initiation gesture can be set to, for example, 1 second, 2 seconds, 5 seconds, or 10 seconds after ending the stylus input. Any other time period can be used as well.

In some examples, the device 100 can detect the location of the stylus even when the stylus is not in contact with the touch-screen display 105. The device 100 can consider the location and orientation of the stylus when determining whether a user is performing an erasure-initiation gesture. The stylus can include mechanisms detectable by the device 100 to communicate the desired information. For example, the stylus can include an inertial measurement unit, such as accelerometers, lean angle sensors, and so on. The stylus can also include a magnetic field generator that can be detected by the device 100. In some examples, the stylus communicates with the device 100 through a form of wireless communication, such as BLUETOOTH. The device 100 can gather information from the stylus, either by sensing the stylus or by receiving information from the stylus, and use this information to determine whether the user is performing a gesture.

Continuing the example, the device 100 might sense a touch point 130 by the user. However, if the stylus is still in contact with the touch-screen display 105, the device 100 can determine that an erasure-initiation gesture was not intended. Similarly, if the stylus is not in contact with the touch-screen display 105 but is hovering close to the display, the device can determine that an erasure-initiation gesture is not intended at that time. For example, the device 100 can include a rule that if the tip of the stylus is within 2 mm of the touch-screen display 105, a touch point 130 made by the user will not be considered an erasure-initiation gesture. In another example, the device 100 can sense that the stylus is near the touch-screen display 105 but located in a position that does not indicate imminent use of the stylus. A user might hold the stylus in a particular orientation when not actively using it—for example, the user can hold the stylus in an orientation parallel to the surface of the touch-screen display 105. In this scenario, the device 100 can use position information from the stylus to determine that a touch point 130 is intended to initiate an erasure function.

In one example, the detection process can detect a palm that the process determines is associated with the hand holding the stylus. This can occur, for example, by recognizing a touch point 130 that remains within a distance range from the stylus or moves with the stylus. While the stylus remains in contact or proximity with the display 105, the detection process can ignore additional touching that is on the same side of the stylus as the palm. However, the detection process can compare detected touch points 130 to the library of recognized gestures when the touch points 130 are on the opposite side of the stylus from the palm. Likewise, touch points 130 that are a threshold distance away from the stylus can be processed to determine whether they represent a recognized gesture.

Figure 2:
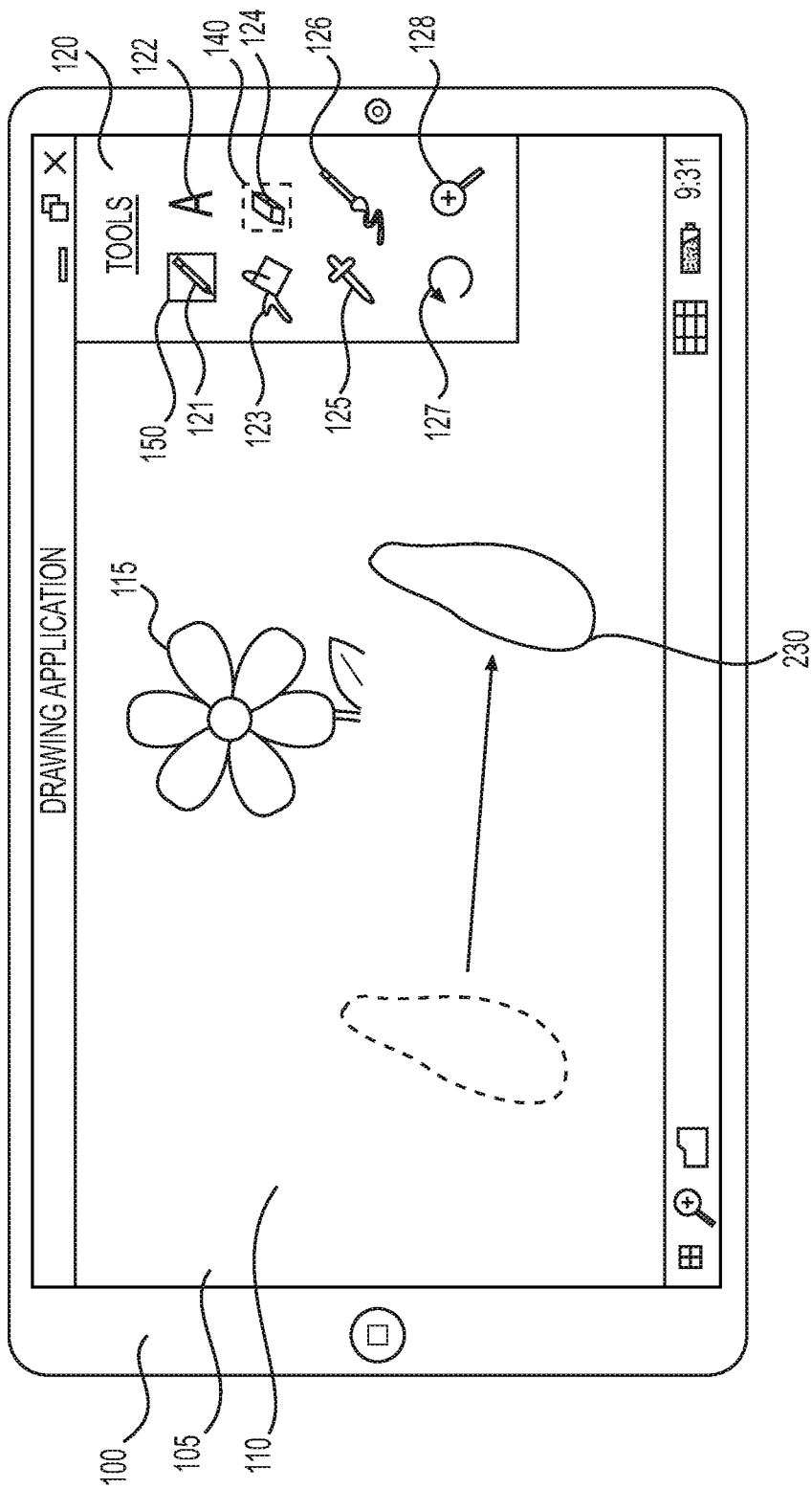
FIG. 2 is an exemplary illustration of a device with a touch-screen display implementing an erasure function.

FIG. 2 is an example illustration for implementing an eraser function. The eraser tool 124 can be selected by an erasure-initiation gesture as discussed with regard to FIG. 1. In one example, the erasure-initiation gesture includes detecting a contact patch 230 that covers a predefined area or shape, and determining that a threshold amount of time has passed since the stylus left the screen.

As shown in FIG. 2, the eraser tool 124 includes a temporary selection indicator 140 surrounding the eraser tool 124 and indicating that it is temporarily active. The pencil tool 121 is still active, as indicated by the selection indicator 150. In one example, the pencil tool 121 can still be used by applying the stylus to the touch-screen display 105. In that example, the eraser tool 124 can be only partially activated—that is, the eraser tool 124 can be made available for use by the user's hand or other body part, while the stylus would still utilize the activated pencil tool 121. In this way the user can quickly switch back and forth between erasing and drawing without having to select a different tool for each transition.

When an erasure function is initiated through an erasure-initiation gesture, the device 100 can allow for the user to perform erasures using a finger, hand, forearm, or other skin contact. The contact patch 230 of FIG. 2 represents skin contact between the user and the touch-screen display 105, such as the side of the user's hand. The contact patch 230 is shown as being initially applied in the location depicted by the continuous dashed line, and then dragged to the location depicted by the continuous solid line. An arrow follows the path that the contact patch 230 makes across the GUI 110.

As shown in FIG. 2, the movement of the contact patch 230 causes the drawing 115 to be erased in any location corresponding to contact by the contact patch 230 as it moves across the GUI 110. In this example, the drawing 115 is a simple flower, and a portion of the stem and a leaf has been erased as a result of the contact patch 230 moving across the drawing 115. In some examples, the contact patch 230 does not erase all portions of the drawing 115 with which it comes into contact. For example, if the drawing 115 has multiple layers, the user can elect to erase fewer than all of the layers. In that case, only the selected layer or layers are erased. This concept, as well as mechanisms for selecting layers, is discussed in more detail with respect to FIG. 4.

While the contact patch 230 of FIG. 2 is shown in a shape that approximates the side of a user's hand, the contact patch 230 can take any form. For example, the user can use any type of skin contact, ranging from a portion of a fingertip to an entire hand (or both hands). The contact patch 230 is not limited to the user's hands, though, and can be formed by contact with the skin of the user. Examples include a user's forearm, shoulder, stomach, hips, knees, and so on. This functionality can be advantageous for users with disabilities or injuries, or for users holding items in their hands.

After initiating an erasure function, the device 100 can run one or more processes to determine when to terminate the erasure function. A first example process applies in a scenario where the user initiates the erasure function but does not make any erasures. This can happen if the user unknowingly initiates the erasure function or simply changes his or her mind about performing an erasure. In this example, the process executes on a processor of the device 100 and tracks the amount of time that has elapsed since the initiation of the erasure function. If no erasure is made before a first threshold time limit is reached, the erasure function can be terminated. For example, the device 100 can set the threshold time limit at 1 second, 2 seconds, 3 seconds, or any other amount of time. If the user initiates an erasure function and does not perform any erasure within that amount of time, the erasure function can be terminated.

A second example process can be executing in the event that the user performs an erasure after initiating the erasure function. The second example process can cause the processor of the device 100 to measure the amount of time that has elapsed since the last erasure input. For example, the device 100 can set the threshold time limit at 1 second, 2 seconds, 3 seconds, or any other amount of time. If the user allows that threshold amount of time to elapse after performing an erasure, the erasure function can be terminated. If, instead, the user performs an additional erasure, the timer can restart. In addition, other user actions can restart or otherwise adjust the timer for determining when to terminate the erasure function. For example, if the user performs a rewind function (described in more detail with respect to FIG. 3) before the erasure function has been terminated, the timer can be stopped and then restarted at the conclusion of the rewind function.

Multiple processes for terminating an erasure function can be run simultaneously. For example, the first and second example processes described above can run at the same time. The first example process can track the amount of time elapsed between the erasure-function initiation and the first erasure, if any occurs. The second example process can track the amount of time elapsed since the most recent erasure. If either of these processes determine that the tracked amount of time exceeds the respective threshold, the processor of the device 100 can terminate the erasure function.

Figure 3:
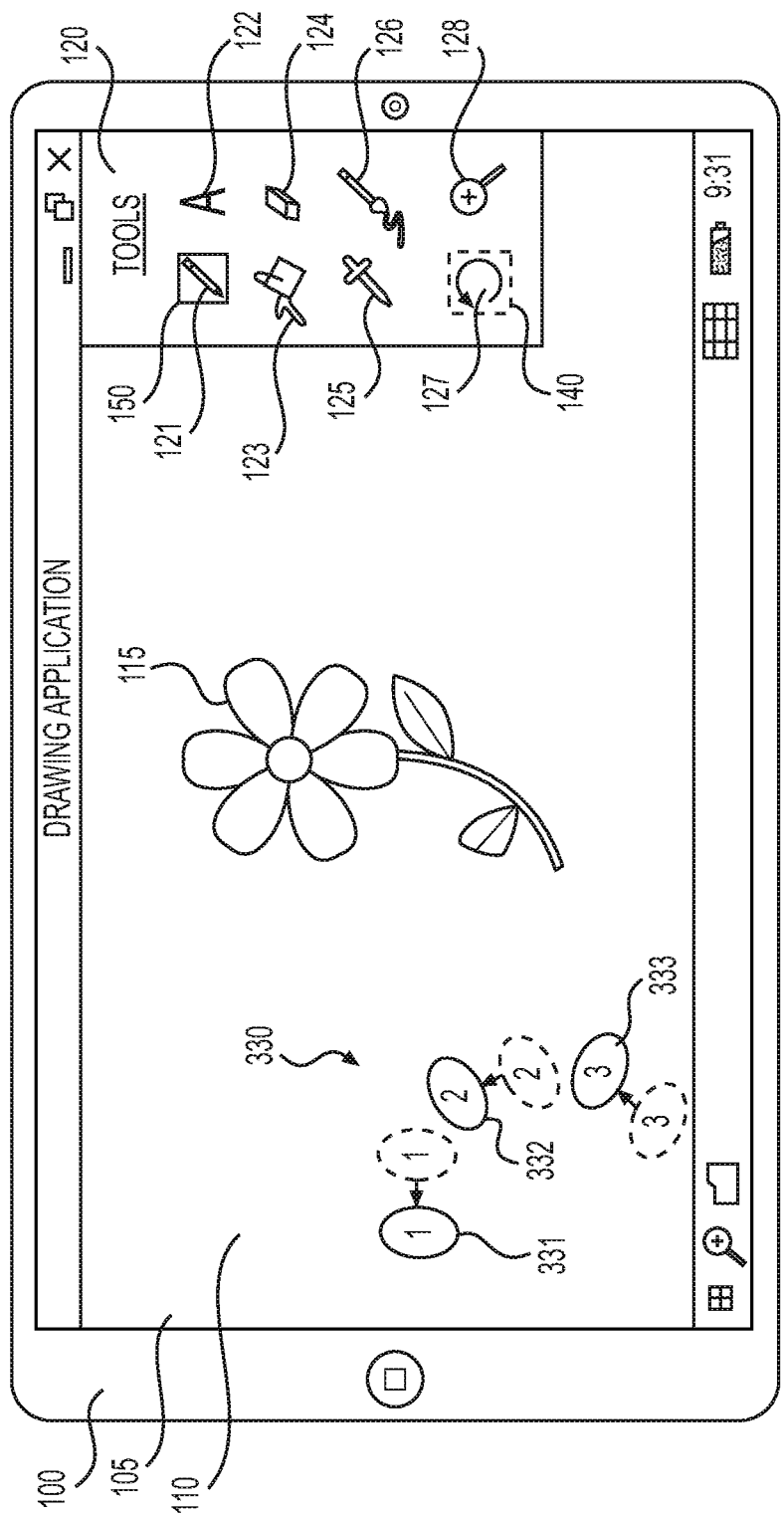
FIG. 3 is an exemplary illustration of a device with a touch-screen display implementing a rewind function.

At any time after the erasure function has been initiated, a user can initiate a rewind function, as shown in FIG. 3. A rewind gesture 330 can be used to initiate the rewind function. In an example, the rewind gesture 330 requires the user to apply three contact points 331, 332, 333 to the touch-screen display 105 and rotate those three contact points 331, 332, 333 in a counterclockwise motion. More specifically, for each contact point 331, 332, 333 a first position is shown with dashed lines, while a second position is shown in solid lines, with arrows indicating the direction of movement.

The rewind function can cause the processor of the device 100 to undo some or all of the erasures performed during an erasure event. The rewind function can be implemented at any time, regardless of whether the erasure function is still active or not. In this example, the rewind function has been utilized to restore a portion of the erased material from the drawing 115. As shown in FIG. 3, however, portions of the drawing 115 remain erased. In one example, further counterclockwise rotation of the contact points 331, 332, 333 can restore the remainder of the drawing 115 as originally shown in FIG. 1.

In an example, when the rewind function is activated by the user, the temporary selection indicator 140 can be applied to the undo button 127, indicating that some type of undo is in progress. However, the selection indicator 150 can remain on a tool being used before the erasure or rewind functions—here, the selection indicator 150 remains on the pencil tool 121. When the user activates the rewind function, he or she can rotate contact points 331, 332, 333 in either a clockwise or counterclockwise manner, depending on the intended task. Continued rotation in a counterclockwise direction incrementally restores items erased further back in time. A clockwise rotation incrementally reverts the drawing 115 back toward the erased state. With this feature, the user can fine tune their erasures and ensure that nothing is accidentally erased or lost.

Although the rewind function is shown utilizing three contact points 331, 332, 333, other gestures can correspond to the rewind function. In one example, a user can apply a single contact point 331 and move that contact point 331 in a counterclockwise, circular motion. In another example, a user can drag a contact point 331 across the screen, such as in a right-to-left direction, incrementally rewinding or restoring based on the location of the contact point 331 relative to the width of the screen. For example, dragging the contact point 331 toward the left side of the touch-screen display 105 can perform the unwind function, while dragging the contact point 331 toward the right side of the touch-screen display 105 can restore any unwound erasures. Other gestures can also be used for the rewind function.

Figure 4:
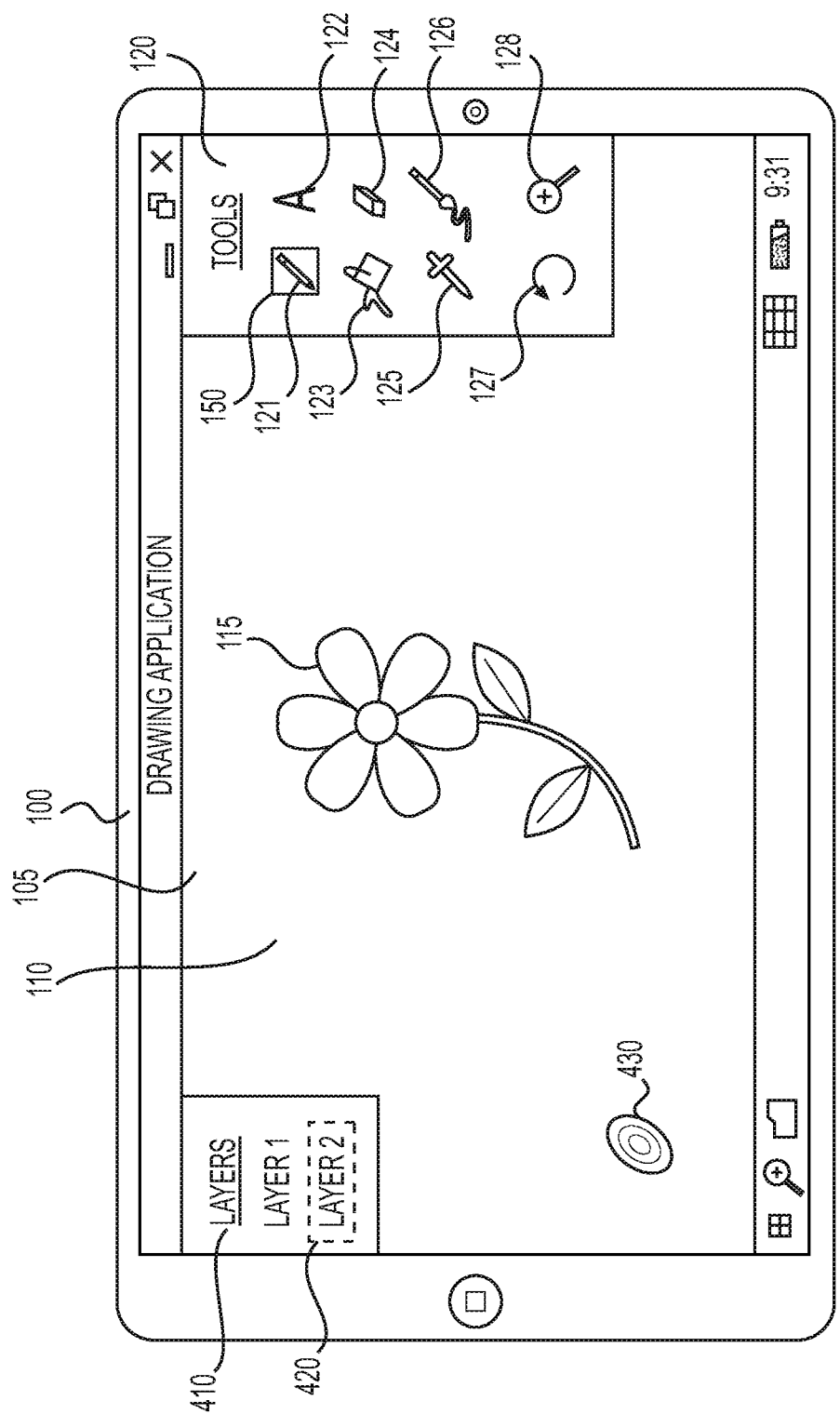
FIG. 4 is an exemplary illustration of a device with a touch-screen display implementing a force-touch function.

In some examples, a user device 100 can sense varying amounts of force in a user's contact with the touch-screen display 105. This can allow the device 100 to perform force-touch functions, an example of which is provided in FIG. 4. In the example of FIG. 4, the force-touch function can be used to select between multiple layers of a drawing 115 in a Drawing Application. A user can apply a contact point 430 to the touch-screen display 105 and press down against the touch-screen display 105 to apply force. The contour lines drawn within contact point 430 represent levels of force applies to the contact point 430 by the user.

In this example, the force applied to the contact point 430 can cause the Drawing Application to launch a layer-selection menu 410. From there, the user can select a layer of the drawing 115 to make active. In one example, the amount of force can dictate which layer is selected, with increasingly greater force selecting increasingly lower layers.

In another example, the user can make that selection by manually selecting the desired layer—for example, by clicking or touching the "Layer 2" designator within the layer-selection menu 410. However, additional gestures can also be used to aid in the selection. For example, the device 100 can allow a user to drag the contact point 430 up or down to select between various layers in the layer-selection menu 410. In this example, the user has selected Layer 2. The selection can be indicated by a layer-selection indicator 420.

The device 100 or an application running on the device 100 can also map additional or alternative functionality to the force-touch function. Some examples include: zooming in or out, adjusting shading or color, initiating a rewind function, initiating an erasure function, selecting any of the tools in the toolbar 120, and performing a right-click. In the example of FIG. 4, the user can select a layer without disengaging the selected tool. Here, the pencil tool 121 remains selected and includes a selection indicator 150. This can allow the user to continue drawing on the selected layer without needing to reselect the tool 121 before proceeding.

In one example, the erasure gesture can include a requisite level of force for initiation. This can allow a user to press down and use their thumb to initiate the eraser tool 124 at an appropriate layer(s), and then slide their thumb to perform the erasure.

Figure 5:
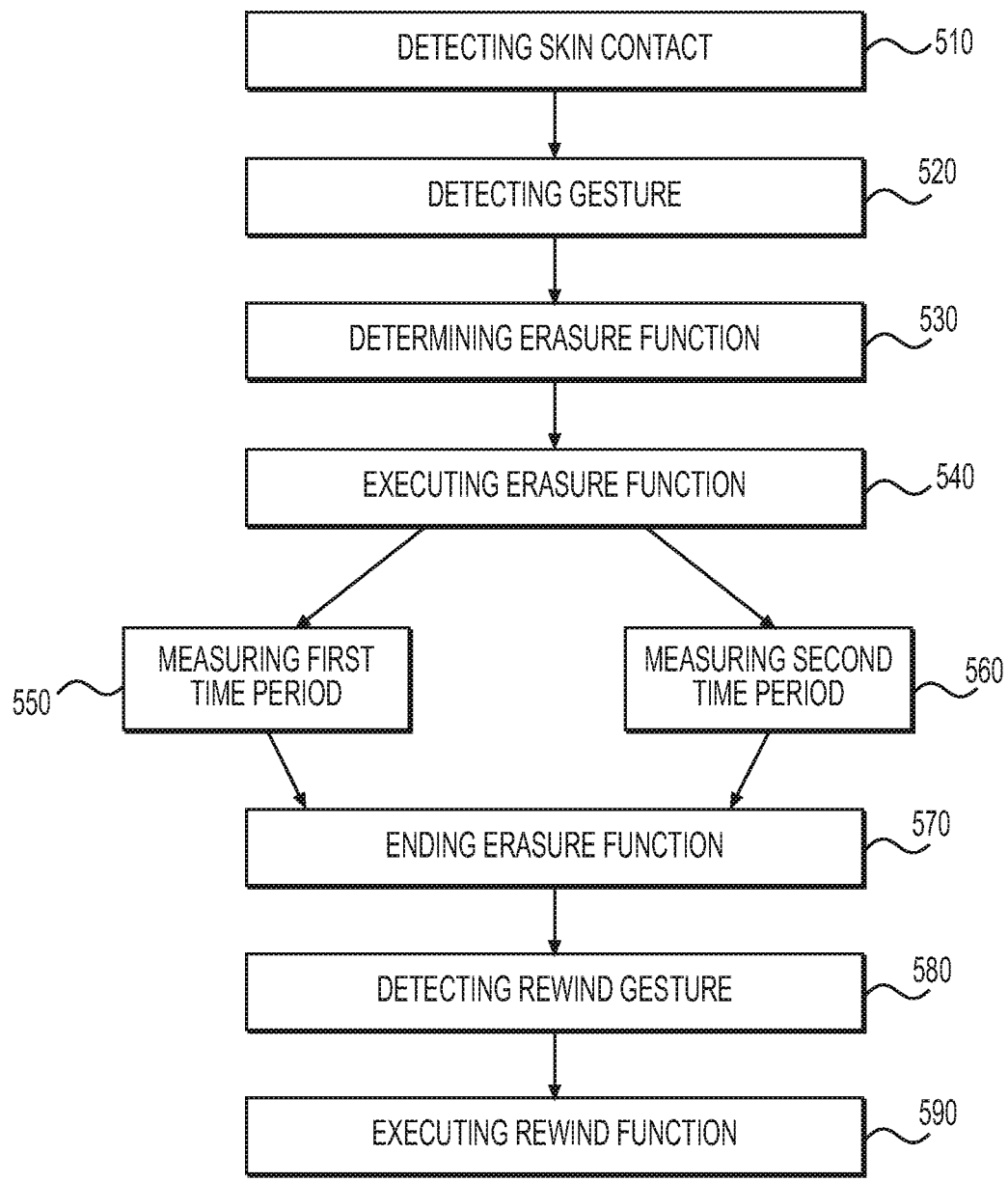
FIG. 5 is a flowchart of an exemplary method executed in a system.

FIG. 5 provides a flowchart of an example method executed in a system. For example, the method can be executed on a device 100. At stage 510, the system can detect skin contact with the touch-screen display 105. The touch-screen display 105 can detect skin using at least one sensing mechanism for sensing the presence, location, pressure, and movement of any skin contact. For example, the touch-screen display 105 can utilize capacitive sensing, resistive sensing, force sensing, magnetic sensing, or any other type of sensing technology to determine skin contact from the user.

The detection of the skin contact can be part of a process that executes in the operating system or in conjunction with a display driver for the touch-screen display 105. The Drawing Application or other application can interface with the operating system or display driver to receive quantized values describing the skin contact. The quantized values can include coordinates that define a shape or an area in one example, such as the contact patch 230. In another example, the quantized values can include a force component to indicate how hard the user is pushing. In still another example, the quantized values can include a movement vector to indicate a direction and rate that the skin contact is moving relative to the touch-screen display 105 based on a series of samples taken of the skin contact.

At stage 520, the system can detect a gesture based on the skin contact by the user. For example, the processor of the device 100 can execute an operating-system process or sub-process that quantizes the user's interaction and performs further analysis on the quantized values. The processor can compare the quantized values to a library of recognized gestures stored in the memory of the device 100. The recognized gestures can include predefined motions, contact shapes, contact area sizes, and contact pressure levels. If the quantized values fall within the recognized bounds of a particular gesture, the processor can determine that the user intended that particular gesture. In some examples, multiple gesture libraries can be stored on the device 100 for access and comparison to the user's input. In addition to the standard gesture library included on a device 100, the device 100 can also have gesture libraries that are specific to individual applications.

In one example, the Drawing Application or other application receives the quantized values that are generated in stage 520. This can occur, for example, when the Drawing Application is in the foreground at a location corresponding to a coordinate in the quantized values. The Drawing Application can implement a listener process that receives the quantized values from the operating system or device driver of the touch-screen display 105. In one example, the Drawing Application can be responsible for matching the quantized values to recognized gestures in one or more libraries. This can allow for custom gestures within the Drawing Application, including one or more erasure functions.

At stage 530, the system can determine that the gesture detected at stage 520 indicates an erasure function. For example, the memory of the device 100 can include a list of recognized gestures in a gesture library. One or more of these recognized gestures can be mapped to an erasure function. The device 100 can also take into account other relevant information beyond the gesture recognition. For example, the device 100 can consider whether a particular application is running or active on the GUI 110. As another example, the device 100 can consider various factors related to the use of a stylus, including detecting when the stylus is contacting or near the touch-screen display 105, and the time elapsed since the stylus was last used. Any other relevant factors for determining erasures can be accounted for by the device 100 at stage 530.

At stage 540, the device 100 can execute an erasure function. When an erasure function is initiated via an erasure-initiation gesture, the device 100 can allow for the user to perform erasures using a finger, hand, forearm, or other skin contact. For example, the user can drag a contact patch 230 across the GUI 110, erasing portions of a drawing 115 corresponding to locations contacted by the contact patch 230. Although the erasure function allows for a user to perform erasures, the erasure function can also execute without the user performing any subsequent erasures.

After initiating the erasure function, the device 100 can, at stage 550, measure a first time period. More specifically a process can execute on a processor of the device 100 and track the amount of time that has elapsed since the initiation of the erasure function. If no erasure is made before a first threshold time limit is reached, the erasure function can be terminated. For example, the device 100 can set the threshold time limit at 1 second, 2 seconds, 3 seconds, or any other amount of time. If the user initiations an erasure function and does not perform any erasure within that amount of time, the erasure function can be terminated.

If, after initiating the erasure function, the device 100 detects an erasure by the user, then at stage 560 the device 100 can measure a second time period. For example, a process can cause the processor of the device 100 to measure the amount of time that has elapsed since the last erasure input. For example, the device 100 can set the threshold time limit at 1 second, 2 seconds, 3 seconds, or any other amount of time. If the user allows that threshold amount of time to elapse after performing an erasure, the erasure function can be terminated. If, instead, the user performs an additional erasure, the timer can restart. In addition, other user actions can restart or otherwise adjust the timer for determining when to terminate the erasure function. For example, if the user performs a rewind function before the erasure function has been terminated, the timer can be stopped and then restarted at the conclusion of the rewind function.

Based on the results of stages 550 and 560, the device 100 can end the erasure function at stage 570. At stage 580, the device 100 can detect a rewind gesture. The process for recognizing a rewind gesture 330 can be similar to the process for detecting an erasure gesture, with the device 100 sensing user input and comparing that to potential gestures within one or more gesture libraries. In the case of detecting a rewind gesture, the device 100 can set a time limit after ending an erasure function within which the rewind gesture 330 is available. For example, a time limit of 5 seconds, 10 seconds, 15 seconds, or any other amount of time can be used. If the user performs a rewind gesture 330 within that time period, the device 100 can cause a processor to execute a rewind function at stage 590.

At stage 590, the rewind function can cause the processor of the device 100 to "undo" some or all of the erasures performed during an erasure event. Although stage 590 is shown following the ending of the erasure function at stage 570, the rewind function can be executed at any time after executing the erasure function at stage 540, regardless of whether the erasure function is still active or not.

In some examples, the rewind function can operate independently of any erasure function. In addition, the rewind function can undo multiple independent functions. For example, a user may perform the functions of selecting an object, moving the object to a new location, and then filling the object with a color. The rewind function can cause the processor of the device 100 to undo these functions in reverse order. As the user continues the rewind function, the processor can revert the object to the previous color, then move the object to the original location, then unselect the object. The user can choose to stop the rewind function at any stage, thereby controlling how many functions are rewound.

Although much of the description herein refers or relates to an erasure function, the systems and methods described herein can perform additional or alternative functions as well. For example, the gesture detection mechanism of the device 100 can detect a gesture for performing graphical modifications in a graphics program. The graphical modification can be, for example, a smudging effect. A user can initiate the smudging function using an initiation procedure similar to that described in FIG. 1. The device 100 can execute the smudging function and allow a user to perform smudging through skin contact with the touch-screen display 105.

In another example, the gesture recognition functionality of the device 100 can be used to edit text. When a user is working in an application containing text, certain gestures can be used to perform different tasks. One example can include deleting text. A user can use a contact point 130 or a stylus to circle one or more words, and then perform a deletion gesture. The deletion gesture can be similar to a deletion symbol used for proofreading. That is, the deletion gesture can include striking through a portion of text and then performing a loop after the text to complete the deletion gesture. In one example, when the processor detects a deletion gesture, the processor causes one or more icons or buttons to appear adjacent to the selected text. One icon can provide the user with a button to delete the text immediately. The other button can provide an automated deletion notification. For example, the deletion notification can have a timer that counts down from 5 or 10 seconds. If the user does not cancel the automated deletion, then the processor will delete the selected text once the timer runs. In another example, if the user does not cancel the automated deletion, the processor will cancel the function once the timer runs. The user can cancel the deletion by, for example, selecting the automated deletion notification or performing a different gesture.

Another example can include italicizing text. A user can use a contact point 130 or a stylus to circle one or more words, and then perform an italicizing gesture such as writing the letter "I" above the circled text. Another example can include underlining text. A user can select multiple words by, for example, circling them with a stylus, and then perform an underlining gesture such as drawing a line under the selected text. In another example, a strikethrough function can be performed by drawing the line through the selected text, rather than under it. Similar examples can include changing text size, moving text, and autocorrecting spelling errors. In any of these examples, the system can provide one or more buttons indicating the desired function and allowing a user to confirm or cancel. For example, after recognizing an underlining gesture on selected text, the system can provide a button adjacent to the text that allows the user to complete the italicizing, underlining, or strikethrough. The system can also provide a button with a countdown timer, after which the italicizing, underlining, or strikethrough will be automatically performed or not performed. In some examples, the user can provide additional input by, for example, providing a contact point 130 at some point on the touch-screen display 105 while the user performs the gesture. For example, the user can hold his or her thumb in the bottom left corner of the screen while performing an underline function. The processor can recognize the thumb in the corner of the screen as indicating that the user wishes to perform the underline without any icons or buttons displaying. Alternatively, the processor can recognize it as requesting that the underline embed within the font rather than appearing as a drawn line. Any other potential functions can be mapped to this feature.

In another example, a gesture recognition procedure can be used to enable the stylus to perform additional functions. If the device 100 is executing an application that supports three-dimensional shapes, models, or drawings, the user can enable user contact or a stylus to modify objects or viewpoints. For example, the user can perform a gesture to initiate an object modification function. When the device 100 executes the object modification function, the user can move or rotate the object using one or more contact points 130. In addition, the user can perform the same functions with a stylus. And because a stylus can potentially be detected even when it is not contacting the screen, the stylus can be used to adjust aspects of the three-dimensional object. For example, by touching the stylus to the touch-screen display 105 and pulling away from the touch-screen display, a portion of the object can be enlarged.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A computing device, comprising:
    a touch-screen display;
    a non-transitory, computer-readable medium that contains instructions;
    a processor that executes the instructions to perform operations including:
        detecting skin contact with the touch-screen display;
        detecting, based on the skin contact, a first gesture;
        determining that the first gesture indicates an erasure function;
        based on the determination, executing the erasure function;
        ending the erasure function; and
        detecting a rewind gesture by identifying a counter-clockwise rotation of three contact points of a user on the touch-screen display, wherein detecting the rewind gesture causes the processor to incrementally restore items corresponding to erased content, wherein continued rotation in the counterclockwise rotation causes items erased further back in time to be restored such that items are restored in an opposite order to an order in which they were erased, and wherein a clockwise rotation of the three contact points incrementally reverts restored content back to an erased state such that items are reverted to an erased stated in an opposite order to the order in which they were restored.

2. The computing device of claim 1, wherein determining that the first gesture indicates the erasure function comprises comparing the first gesture to at least one predetermined erasure-initiation gesture.

3. The computing device of claim 2, wherein the at least one predetermined erasure-initiation gesture is at least one of: a back-and-forth swipe, a wiping motion using a palm of a hand, a wiping motion using a side of a hand, an extended finger press, a force finger press, or a looping motion using a finger.

4. The computing device of claim 1, wherein determining that the first gesture indicates the erasure function comprises analyzing at least one gesture factor, the at least one gesture factor comprising at least one of: a location of the first gesture on the display, a proximity of the first gesture to an erasable item, a force of the skin contact, a number of fingers associated with the first gesture, an application associated with the first gesture, or a fingerprint identification of a finger used for the first gesture.

5. The computing device of claim 4, further comprising a stylus, wherein the at least one gesture factor comprises at least one of: a time period between when the stylus was last detected relative to the touch-screen display and when the first gesture is detected, a proximity of the stylus to the touch-screen display, a proximity of the stylus to the skin contact, or an orientation of the stylus relative to the touch-screen display.

6. The computing device of claim 1, wherein the operations performed by the processor further comprise:
   determining a force component to the skin contact; and
   determining a layer within a plurality of layers in which to perform the erasure function based on the force component.

7. The computing device of claim 1, wherein the operations performed by the processor further comprise ending the erasure function after at least one of:
   a first time period, measured from the time of the first gesture associated with the erasure function, elapses without additional skin contact, or
   a second time period, measured from the time of a last skin contact associated with executing the erasure function to perform an erasure, elapses without additional skin contact.

8. A non-transitory, computer-readable medium containing instructions that, when executed by a processor, performs operations for executing an erasure function on a touch-screen display, the operations comprising:
   detecting skin contact with the touch-screen display;
   detecting, based on the skin contact, a first gesture;
   determining that the first gesture indicates an erasure function;
   based on the determination, executing the erasure function;
   ending the erasure function; and
   detecting a rewind gesture by identifying a counterclockwise rotation of three contact points of a user on the touch-screen display, wherein detecting the rewind gesture causes the processor to incrementally restore items corresponding to erased content, wherein continued rotation in the counterclockwise rotation causes items erased further back in time to be restored such that items are restored in an opposite order to an order in which they were erased, and wherein a clockwise rotation of the three contact points incrementally reverts restored content back to an erased state such that items are restored in an opposite order to an order in which they were erased.

9. The non-transitory, computer-readable medium of claim 8, wherein determining that the first gesture indicates the erasure function comprises comparing the first gesture to at least one predetermined erasure-initiation gesture.

10. The non-transitory, computer-readable medium of claim 9, wherein the at least one predetermined erasure-initiation gesture is at least one of: a back-and-forth swipe, a wiping motion using a palm of a hand, a wiping motion using a side of a hand, an extended finger press, a force finger press, and a looping motion using a finger.

11. The non-transitory, computer-readable medium of claim 8, wherein determining that the first gesture indicates the erasure function comprises analyzing at least one gesture factor, the at least one gesture factor comprising at least one of:
   a location of the first gesture on the display, a proximity of the first gesture to an erasable item;
   a force of the skin contact, a number of fingers associated with the first gesture;
   an application associated with the first gesture;
   a fingerprint identification of a finger used for the first gesture;
   a time period between when a stylus was last detected relative to the touch-screen display and when the first gesture is detected;
   a proximity of the stylus to the touch-screen display;
   a proximity of the stylus to the skin contact; and
   an orientation of the stylus relative to the touch-screen display.

12. The non-transitory, computer-readable medium of claim 8, the operations further comprising:
   determining a force component to the skin contact; and
   determining a layer within a plurality of layers in which to perform the erasure function based on the force component.

13. The non-transitory, computer-readable medium of claim 8, wherein the operations performed by the processor further comprise ending the erasure function after at least one of:
   a first time period, measured from the time of the first gesture associated with the erasure function, elapses without additional skin contact, or
   a second time period, measured from the time of a last skin contact associated with executing the erasure function to perform an erasure, elapses without additional skin contact.

14. The non-transitory, computer-readable medium of claim 8, wherein the operations performed by the processor further comprise:
   ending the erasure function, and
   detecting a rewind gesture, wherein detecting the rewind gesture causes the processor to restore at least a portion of erased content.

15. A method for executing an erasure function on a touch-screen display, comprising:
   detecting skin contact with the touch-screen display;
   detecting, based on the skin contact, a first gesture;
   determining that the first gesture indicates an erasure function;
   based on the determination, executing the erasure function;
   ending the erasure function, and
   detecting a rewind gesture by identifying a counterclockwise rotation of three points of a user on the touch-screen display, wherein detecting the rewind gesture further comprises incrementally restoring items corresponding to erased content, wherein continued rotation in the counterclockwise rotation causes items erased further back in time to be restored such that items are restored in an opposite order to an order in which they were erased, and wherein a clockwise rotation of the three contact points incrementally reverts restored content back to an erased state such that items are restored in an opposite order to an order in which they were erased.

16. The method of claim 15, wherein determining that the first gesture indicates the erasure function comprises comparing the first gesture to at least one predetermined erasure-initiation gesture.

17. The method of claim 16, wherein the at least one predetermined erasure-initiation gesture is at least one of: a back-and-forth swipe, a wiping motion using a palm of a hand, a wiping motion using a side of a hand, an extended finger press, a force finger press, and a looping motion using a finger.

18. The method of claim 15, wherein determining that the first gesture indicates the erasure function comprises analyzing at least one gesture factor, the at least one gesture factor comprising at least one of:
- a location of the first gesture on the display, a proximity of the first gesture to an erasable item;
- a force of the skin contact, a number of fingers associated with the first gesture;
- an application associated with the first gesture;
- a fingerprint identification of a finger used for the first gesture;
- a time period between when a stylus was last detected relative to the touch-screen display and when the first gesture is detected;
- a proximity of the stylus to the touch-screen display;
- a proximity of the stylus to the skin contact; and
- an orientation of the stylus relative to the touch-screen display.

19. The method of claim 15, further comprising:
determining a force component to the skin contact; and
determining a layer within a plurality of layers in which to perform the erasure function based on the force component.

20. The computing device of claim 1, wherein the rewind gesture further causes the erased content to be incrementally restored as the counterclockwise rotation occurs.

* * * * *